(12) United States Patent
Gyllenskog et al.

(10) Patent No.: US 11,977,667 B2
(45) Date of Patent: May 7, 2024

(54) PURGING DATA AT A MEMORY DEVICE

(71) Applicant: Micron Technology, Inc., Boise, ID (US)

(72) Inventors: Christian M. Gyllenskog, Meridian, ID (US); Jonathan S. Parry, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 326 days.

(21) Appl. No.: 17/524,471

(22) Filed: Nov. 11, 2021

(65) Prior Publication Data

US 2022/0164487 A1 May 26, 2022

Related U.S. Application Data

(60) Provisional application No. 63/118,387, filed on Nov. 25, 2020.

(51) Int. Cl.
*G06F 21/60* (2013.01)
*G06F 12/02* (2006.01)
(Continued)

(52) U.S. Cl.
CPC .......... *G06F 21/79* (2013.01); *G06F 12/0246* (2013.01); *G06F 12/0253* (2013.01);
(Continued)

(58) Field of Classification Search
CPC ............. G06F 12/0246; G06F 12/0253; G06F 12/1408; G06F 12/1441; G06F 21/107; G06F 21/54; G06F 21/602; G06F 21/62; G06F 21/6218; G06F 21/78; G06F 21/79; G06F 21/60; G06F 2212/1052; H04L 9/0891; H04L 9/006; H04L 9/088; H04L 9/3226; H04L 9/3263; H04L 63/0492
See application file for complete search history.

(56) References Cited

U.S. PATENT DOCUMENTS 9,235,714 B1 * 1/2016 Cignetti .............. G06F 21/6218
2012/0278529 A1 11/2012 Hars et al.
(Continued)

OTHER PUBLICATIONS

"International Search Report and Written Opinion of the International Searching Authority," issued in connection with Int'l Appl. No. PCT/US21/72410, dated Mar. 2, 2022 (14 pages).

*Primary Examiner* — Le H Luu
(74) *Attorney, Agent, or Firm* — Holland & Hart LLP

(57) ABSTRACT

Methods, systems, and devices for purging data from a memory device are described. A memory system may receive, from a host system, a command to write data to an address storing an encryption key in a first portion of the memory system that is configured to store secure information (e.g., a Replay Protected Memory Block). The encryption key may be configured to encrypt data associated with the host system that is stored in a second portion of the memory system. The memory system may then receive an indication of a purge command from the host system. The memory system may execute the purge command by transferring data from the first portion of the memory system to a third portion of the memory system configured to store secure information and erasing the data from the first portion of the memory system.

25 Claims, 6 Drawing Sheets

(51) Int. Cl.
*G06F 21/54* (2013.01)
*G06F 21/79* (2013.01)
*G06F 21/10* (2013.01)

(52) U.S. Cl.
CPC ............ *G06F 21/54* (2013.01); *G06F 21/602* (2013.01); *G06F 21/107* (2023.08)

(56) References Cited

U.S. PATENT DOCUMENTS

| | | | |
|---|---|---|---|
| 2015/0154121 A1* | 6/2015 | Schmier | G06F 21/60 |
| | | | 713/193 |
| 2017/0230179 A1* | 8/2017 | Mannan | H04L 9/3226 |
| 2019/0236031 A1 | 8/2019 | Kim | |
| 2019/0245853 A1* | 8/2019 | Shaw | H04L 63/0492 |
| 2020/0201785 A1* | 6/2020 | Hanna | H04L 9/0891 |
| 2021/0004498 A1* | 1/2021 | Almeida | H04L 9/006 |
| 2021/0091954 A1* | 3/2021 | Brown | H04L 9/3226 |
| 2021/0110055 A1* | 4/2021 | Miller | H04L 9/088 |
| 2021/0223968 A1* | 7/2021 | Umesawa | H04L 9/3263 |

\* cited by examiner

PURGING DATA AT A MEMORY DEVICE

CROSS REFERENCE

The present application for patent claims the benefit of U.S. Provisional Patent Application No. 63/118,387 by GYLLENSKOG et al., entitled "PURGING DATA AT A MEMORY DEVICE," filed Nov. 25, 2020, which is assigned to the assignee hereof, and which is expressly incorporated by reference herein.

FIELD OF TECHNOLOGY

The following relates generally to one or more systems for memory and more specifically to purging data from a memory device.

BACKGROUND

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), 3-dimensional cross-point memory (3D cross point), not-or (NOR), and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
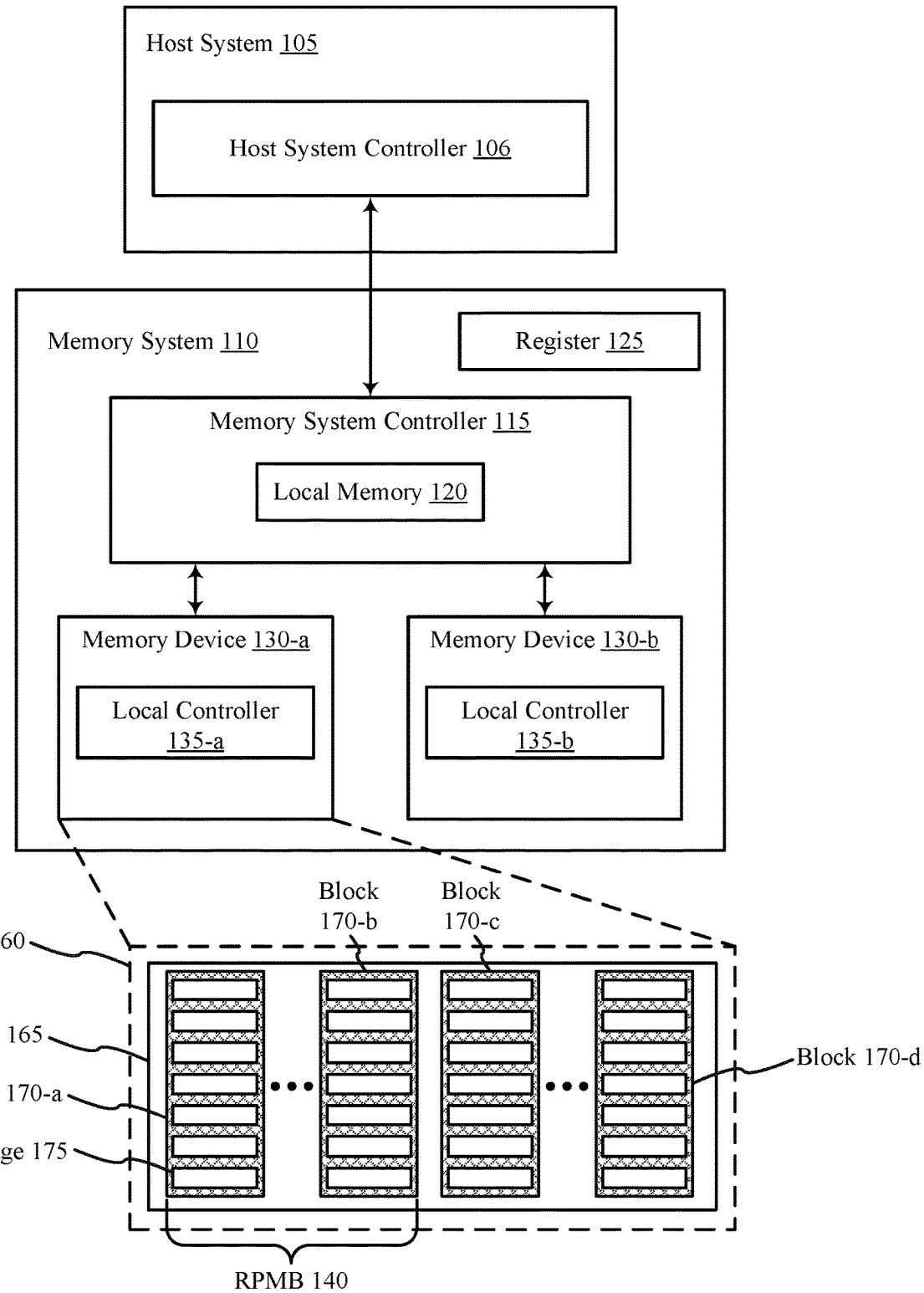
FIG. 1 illustrates an example of a system that supports purging data from a memory device in accordance with examples as disclosed herein.

A memory system may include one or more portions configured to store data securely (e.g., more securely than other portions of the memory system configured to store data). For example, the memory system may include a Replay Protected Memory Block (RPMB) configured to store data securely. In order to access data stored in the RPMB, the memory system may first perform an authentication (e.g., provide a key to access the RPMB). For example, in order to write data to the RPMB, the memory system may perform the authentication procedure (e.g., using an RPMB key) prior to performing an authenticated write operation on the RPMB. In some instances, it may be desirable to erase data stored within the RPMB. For example, the RPMB may store one or more encryption keys for encrypting data stored in another portion of the memory system (e.g., associated with an application). In some cases, access to the encrypted data may be withdrawn. For example, an application may restrict access to a user of the memory system, thus withdrawing the user's access to the encrypted data. Here, it may be desirable to erase the encryption key from the RPMB to prevent the memory system from using the encryption key stored in the RPMB to decrypt the associated data. But in some cases, an RPMB may not be configured to execute an erase command.

Systems, device, and techniques may be described for a memory system to overwrite the data stored in the RPMB and then to execute a purge operation on that portion of the RPMB that formerly stored the data. Such techniques may be utilized by the memory system to 'erase' data from the RPMB without relying on an erase command. The system may execute a write operation (e.g., an authenticated write operation) to write data to an address of the RPMB that is storing the encryption key (e.g., the data that is to be removed). That is, the memory system may overwrite the encryption key (e.g., write other data to an address of the RPMB storing the encryption key) to ensure that the RPMB no longer stores a copy of the encryption key. The memory system may then perform a purge operation (e.g., an authenticated purge operation) at the RPMB. That is, the memory system may transfer the valid data stored within the RPMB from a first portion of the memory system to a second portion of the memory system (e.g., thus moving the RPMB to another portion of the memory system). The memory system may then erase the data from the first portion of the memory system. By first overwriting an encryption key stored within the RPMB and then performing a purge operation at the RPMB, the memory system may erase the encryption key from the RPMB.

Features of the disclosure are initially described in the context of a system and a process flow as described with reference to FIGS. 1 and 2. These and other features of the disclosure are further illustrated by and described with reference to apparatus diagrams and flowcharts that relate to purging data from a memory device as described with reference to FIGS. 3 through 6.

FIG. 1 is an example of a system 100 that supports purging data from a memory device in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB)

flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., PCIe controller, SATA controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a serial advanced technology attachment (SATA) interface, a UFS interface, an eMMC interface, a peripheral component interconnect express (PCIe) interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

Memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, where memory system 110 includes more than one memory device 130, different memory devices 130 within memory system 110 may include the same or different types of memory cells.

The memory system controller 115 may be coupled with and communicate with the host system 105 (e.g., via the physical host interface), and may be an example of a control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130, and other such operations, which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. And in some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric RAM (Fe-RAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), and electrically erasable programmable ROM (EEPROM). Additionally or alternatively, a memory device 130 may include one or more arrays of volatile memory cells. For example, a memory device 130 may include random access memory (RAM) memory cells, such as dynamic RAM (DRAM) memory cells and synchronous DRAM (SDRAM) memory cells.

In some examples, a memory device 130 may include (e.g., on a same die or within a same package) a local controller 135, respectively, which may execute operations on one or more memory cells of the memory device 130. A local controller 135 may operate in conjunction with a memory system controller 115 or may perform one or more functions ascribed herein to the memory system controller 115.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

One or more of the memory devices 130 may include an RPMB 140. The RPMB 140 may be associated with one or more of the blocks 170. For example, the RPMB 140 may include four regions (e.g., four blocks 170, four pages 175, four other partitions of memory cells of a memory device 130), each configured to store data. In some cases, the RPMB 140 may be configured to store data more securely when compared to one or more additional blocks 170 at the memory system 110. For example, the blocks 170 associated with the RPMB 140 may include SLCs, which may be more reliable when compared to other types of memory cells. Additionally, prior to accessing the RPMB 140, the memory system 110 may perform an authentication. For example, the memory system 110 may utilize a key to access data stored at the RPMB 140. In some cases, the RPMB 140 (or RPMB partition) may not be capable of being accessed using the standard command protocol, but rather may be accessed using a unique command protocol that enhances the security of the RPMB 140. The RPMB 140 may provide authenticated and replay protected access to sensitive information stored therein. In some examples, the protocol associated with RPMB 140 (e.g., the key used to write and read the RPMB partition) may mitigate risks associated with replay attacks, as compared with standard memory blocks.

In some cases, RPMB 140 may be configured to store data such as encryption keys. For example, the RPMB 140 may store encryption keys associated with other data stored at the memory system 110. That is, the RPMB 140 may store an encryption key for encrypting and decrypting data stored on another block 170 of the memory device 130-*a*. In some cases, the encryption keys may be derived from a hardware unique key (e.g., associated with the memory system 110). Additionally, the data may be associated with an application that uses encrypted data. Here, a user of the application may have user credentials and the encryption keys may be associated with the user credentials.

In some instances, the memory system 110 may erase one or more encryption keys stored at the RPMB 140. For example, the memory system may erase one or more encryption keys stored at the block 170-*a*. To erase the one or more encryption keys, the host system 105 may transmit a write command to the RPMB 140 (e.g., via the memory system controller 115) to write data to the one or more addresses (e.g., logical block addresses) currently storing the one or more encryption keys. The RPMB 140 may write the data to the one or more addresses, thus overwriting the one or more encryption keys with the data indicated by the write command.

The host system 105 may then indicate, to the memory system 110, to purge the RPMB 140. That is, the host system 105 may transmit a purge command to the memory system 110. Additionally or alternatively, the host system 105 may set a value in the register 125 to a value indicating a purge command. In order to execute the purge command at the RPMB 140, the memory system 110 may first perform an authentication procedure at the RPMB. That is, the memory system 110 may perform the authentication procedure (e.g., using an RPMB key) prior to performing the authenticated purge operation. To execute the purge command of the RPMB 140, the memory system 110 may transfer a latest version of the data stored by the addresses (e.g., the logical block addresses) of the RPMB 140 to other addresses (e.g., other logical block addresses). For example, the memory system 110 may transfer the data stored by the block 170-*a* to another block 170-*b*. In some cases, the memory device 130-*a* may store data (e.g., free lists and garbage lists, a logical-to-physical (L2P) mapping table) indicating whether the addresses of the block 170-*a* are storing valid data, storing invalid data (e.g., garbage data), or not storing any data (e.g., free addresses). Based on the stored data indicating which addresses of the block 170-*a* are storing valid data, the memory device 130-*a* may transfer the valid data to another block 170-*b* associated with the RPMB 140. The memory device 130-*a* may then erase the block 170-*a*. For example, the memory device 130-*a* may execute a garbage collection operation at the block 170-*a*. After purging the RPMB 140, the RPMB 140 may store data at a different block 170-*b*. Additionally, some or all copies of data stored by the RPMB 140 (e.g., at the block 170-*a*) may be erased. By overwriting one or more encryption keys stored by the RPMB 140 and the purging the RPMB 140, the memory system 110 may erase one or more encryption keys from the RPMB 140.

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete, and update an L2P mapping table to associate the logical address (e.g., LBA) for the data with the new, valid block 170 rather than the old, invalid block 170. In some cases, such copying and remapping may be preferable to erasing and rewriting the entire old block 170, due to latency or wearout considerations, for example. In some cases, one or more copies of an L2P mapping table may be stored within the memory cells of the memory device 130 (e.g., within or more blocks 170 or planes 165) for use (e.g., reference and updating) by the local controller 135 or memory system controller 115.

In some cases, L2P tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for some or all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the number of blocks 170 that have been erased may be increased such that more blocks 170 are available to store subsequent data (e.g., data subsequently received from the host system 105).

The system 100 may include any quantity of non-transitory computer readable media that support purging data from a memory device. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, when executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

Figure 2:
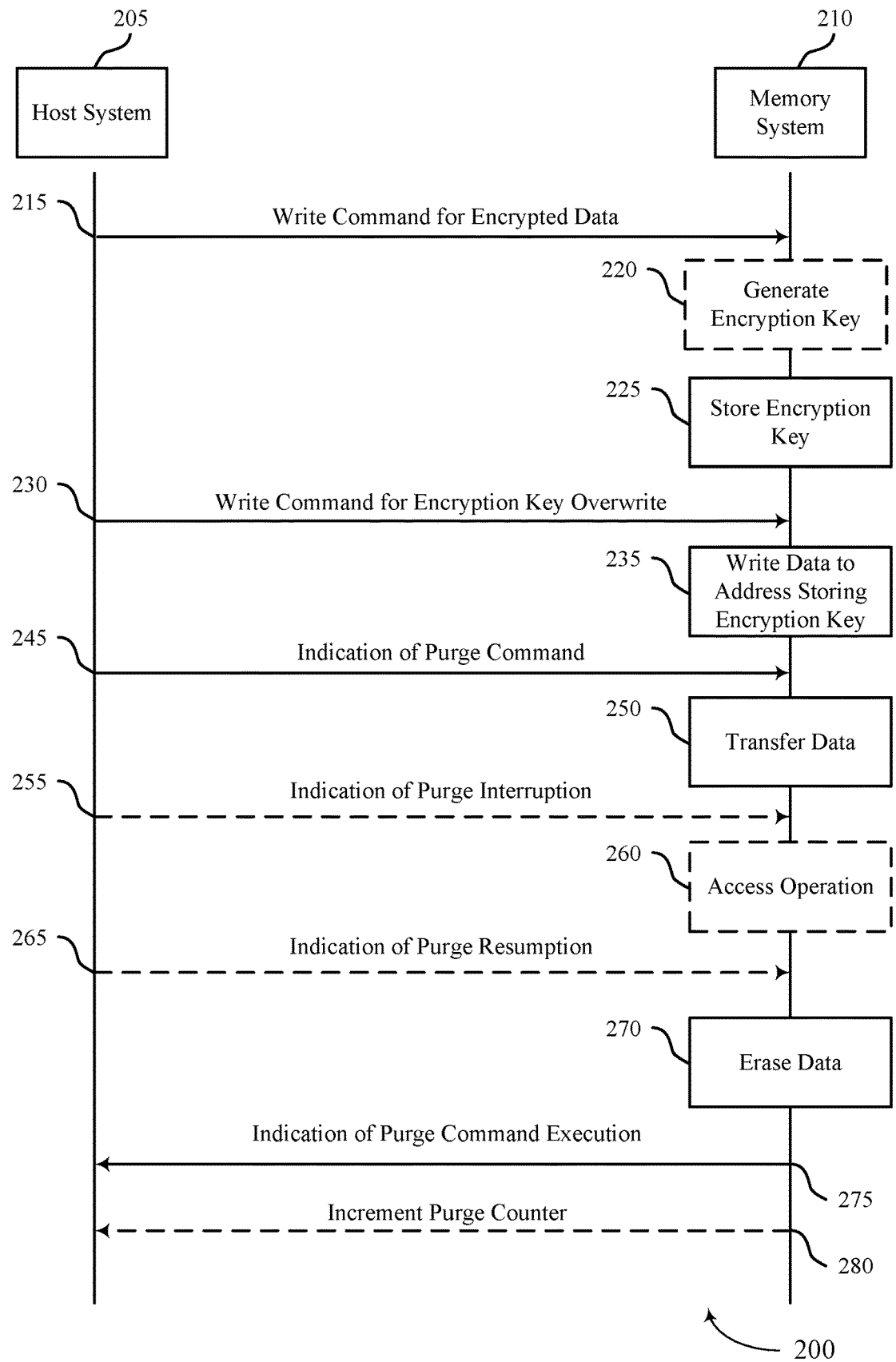
FIG. 2 illustrates an example of a process flow that supports purging data from a memory device in accordance with examples as disclosed herein.

FIG. 2 illustrates an example of a process flow 200 that supports purging data from a memory device in accordance with examples as disclosed herein. The process flow 200 may implement aspects of the systems as described with reference to FIG. 1. For example, operations described by the process flow 200 may be performed by a host system 205 and a memory system 210, which may be examples of the host system 105 and the memory system 110, respectively, as described with reference to FIG. 1. That is, the memory system 210 may include a memory system controller and an RPMB as described with reference to FIG. 1. The process flow 200 may be implemented to erase one or more encryption keys stored at the RPMB. In the following description of the process flow 200, the operations may be performed in different orders or at different times. Some operations may also be omitted from the process flow 200, and other operations may be added to the process flow 200.

At 215, a write command may be transmitted by the host system 205 to the memory system 210. In some cases, the write command may indicate, to the memory system 210, to write encrypted data to one or more addresses of the memory system 210. In one example, the host system 205 may indicate unencrypted data within the write command. Here, the host system 205 may additionally indicate, to the memory system 210, to encrypt the data prior to storing the data at the memory system 210.

At 220, an encryption key may be optionally generated by the memory system 210. In some cases, the host system 205 may indicate the encryption key for the memory system 210 to utilize for encrypting and decrypting the data associated with the write command (e.g., at 210). Here, the memory system 210 may not generate the encryption key at 220. In some other cases, the memory system 210 may generate the encryption key (e.g., based on user credentials, a unique hardware key associated with the memory system).

In either case, the memory system 210 may encrypt the data (e.g., indicated by the write command received at 215) using the encryption key and then store the encrypted data at a memory device of the memory system. For example, the memory system controller 215 may store the encrypted data indicated by the write command received at 215 at a portion of the memory system different from the RPMB. In some cases, the portion of the memory system different from the RPMB may be configured to store data associated with the host system 205 (e.g., host data).

At 225, the encryption key may be stored at an address (e.g., a logical block address) of the RPMB by the memory system 210. In some cases, in order to access the RPMB to store the encryption key, the memory system 210 may perform an authentication procedure. For example, the memory system 210 may provide a key to the RPMB prior to the RPMB storing the encryption key.

The RPMB may store a set of encryption keys, among other information that may benefit from the added security of the RPMB. That is, the RPMB may store the encryption key associated with the encrypted data indicated by the write command received from the host system 205 at 215 in addition to one or more other encryption keys. In some cases, the memory system may erase one or more of the encryption keys from the RPMB. For example, the memory system may erase encryption keys for encrypting or decrypting data stored at the memory system to which a user (e.g., of the memory system, of an application associated with the data) no longer has access. The operations performed by the host system 205 and the memory system 210 at 230, 235, 245, 250, and 270 may result in an encryption key (or other types of data) being erased from the RPMB.

At 230, a command may be transmitted by the host system 205 to the memory system 210 to write data to the RPMB at the address storing the encryption key (or other types of data). That is, the host system 205 may transmit a write command to overwrite the encryption key with other data. The write command may be an authenticated write command. That is, prior to executing the write command, the memory system 210 may perform an authentication procedure (e.g., using the RPMB key). In some cases (e.g., to erase more than one encryption key), the host system 205 may transmit a command to the memory system 210 to write data to addresses storing more than one encryption key.

At 235, the data (e.g., indicated by the command received from the host system 205 at 230) may be written by the memory system 210 to the address of the RPMB to overwrite the encryption key based on receiving command from the host system 205 at 230. In cases that the host system 205 indicated to write data to addresses storing more than one encryption key, the memory system 210 may write the data to the addresses of the RPMB to overwrite the more than one encryption key.

At 245, a purge command may be indicated by the host system 205 to the RPMB to the memory system 210. For example, the host system 205 may transmit a purge command to the memory system 210 indicating a purge operation at the RPMB. In another example, the host system 205 may set a value of a register of the memory system 210 to a value that indicates the purge command. The purge command may be an authenticated purge command. That is, prior to executing the purge command, the memory system 210 may perform an authentication procedure (e.g., using the RPMB key). In some cases, the purge command may be an example of a memory management command, such as a garbage collection command.

At 250, data stored by the RPMB from a first portion of the memory system 210 (e.g., a first block, or a first set of blocks) may be transferred by the memory system 210, based on receiving the indication of the purge command from the host system 205 at 255, to a second portion of the memory system 210 (e.g., to a different block or set of blocks in the RPMB partition). For example, the memory system 210 may transfer the data in response to receiving the indication of the purge command. In another example, the indication of the purge command may cause the memory system 210 to transfer the data. In either example, both the first and second portions of the memory system 210 may be configured to store secure data associated with the RPMB. For example, both the first and second portions of the memory system 210 may include SLCs, which may be configured to store data more securely than other types of memory cells. The data stored by the RPMB that is transferred to the second portion of the memory system 210 may include the data indicated by the host system 205 for overwriting the encryption key and one or more additional encryption keys stored at the RPMB. The one or more additional encryption keys stored at the RPMB may be for encrypting and decrypting other data (e.g., associated with the host system 205) stored at portions of the memory system 210 different from the RPMB.

In some cases, the memory system 210 may store data (e.g., free lists and garbage lists, an L2P mapping table) indicating whether the addresses of the first portion of the memory system 210 (e.g., associated with the RPMB) are storing valid data, storing invalid data (e.g., garbage data), or not storing any data (e.g., free addresses). Based on the stored data indicating which addresses of the first portion of the memory system 210 are storing valid data, the RPMB may transfer the valid data to the second portion of the memory system 210.

At 255, an interrupt to the purge operation may optionally be indicated to the memory system 210 by the host system 205. For example, the host system 205 may set a value of a register at the memory system 210 to a value that indicates to interrupt the purge operation. The host system 205 may optionally indicate to interrupt the purge operation at any point during the purge operation. For example, the host system 205 may indicate to interrupt the purge operation while the memory system 210 is transferring data stored by the RPMB from the first portion of the memory system 210 to the second portion of the memory system 210. In another example, the host system 205 may indicate to interrupt the purge operation while the memory system 210 erases data at 270.

Based on receiving the indicating to interrupt the purge operation, the memory system 210 may stop executing the purge operation. For example, the memory system 210 may stop transferring data stored by the RPMB from the first portion of the memory system 210 to the second portion of the memory system 210. In another example, the memory system 210 may stop erasing data (e.g., at 270).

In cases that the host system 205 indicate the interruption, an access operation (e.g., a read operation, a write operation) may optionally be performed by the memory system 210 on the RPMB at 260. That is, the memory system 210 may not perform access operations at the RPMB during a purge operation. Thus, the host system 205 may indicate to interrupt the purge operation prior to the memory system 210 performing any access operations at the RPMB. In some cases, the memory system 210 may perform the access operation 260 at the RPMB in response to receiving an access command from the host system 205. For example, the host system 205 may transmit an access command to the memory system 210.

In cases that the host system 205 indicate the interruption, an indication to resume the purge operation at 270 may optionally be indicated to the memory system 210 by the host system 205. For example, the host system 205 may indicate to resume the purge operation after the memory system 210 executes the access operation at 260. The host system 205 may indicate to resume the purge operation by setting a value of the register at the memory system to a value that indicates to resume the purge operation. In response to receiving the indication of the purge operation resumption, the memory system 210 may resume the purge operation.

At 270, data stored by the first portion of the memory system 210 may be optionally erased by the memory system 210. For example, the memory system 210 may initiate a garbage collection operation for the first portion of the memory system 210 after transferring the data associated with the RPMB to the second portion of the memory system 210. The erase operation may be an authenticated erase operation. That is, prior to executing the erase operation, the memory system 210 may perform an authentication procedure (e.g., using the RPMB key).

At 275, an indication that the purge command is complete (e.g., that an execution of the purge command is complete) may be indicated to the host system 205 by the memory system 210 based on the erasing.

At 280, a purge counter may optionally be incremented by the memory system 210. The purge counter may indicate a quantity of purge operations performed at the RPMB.

Figure 3:
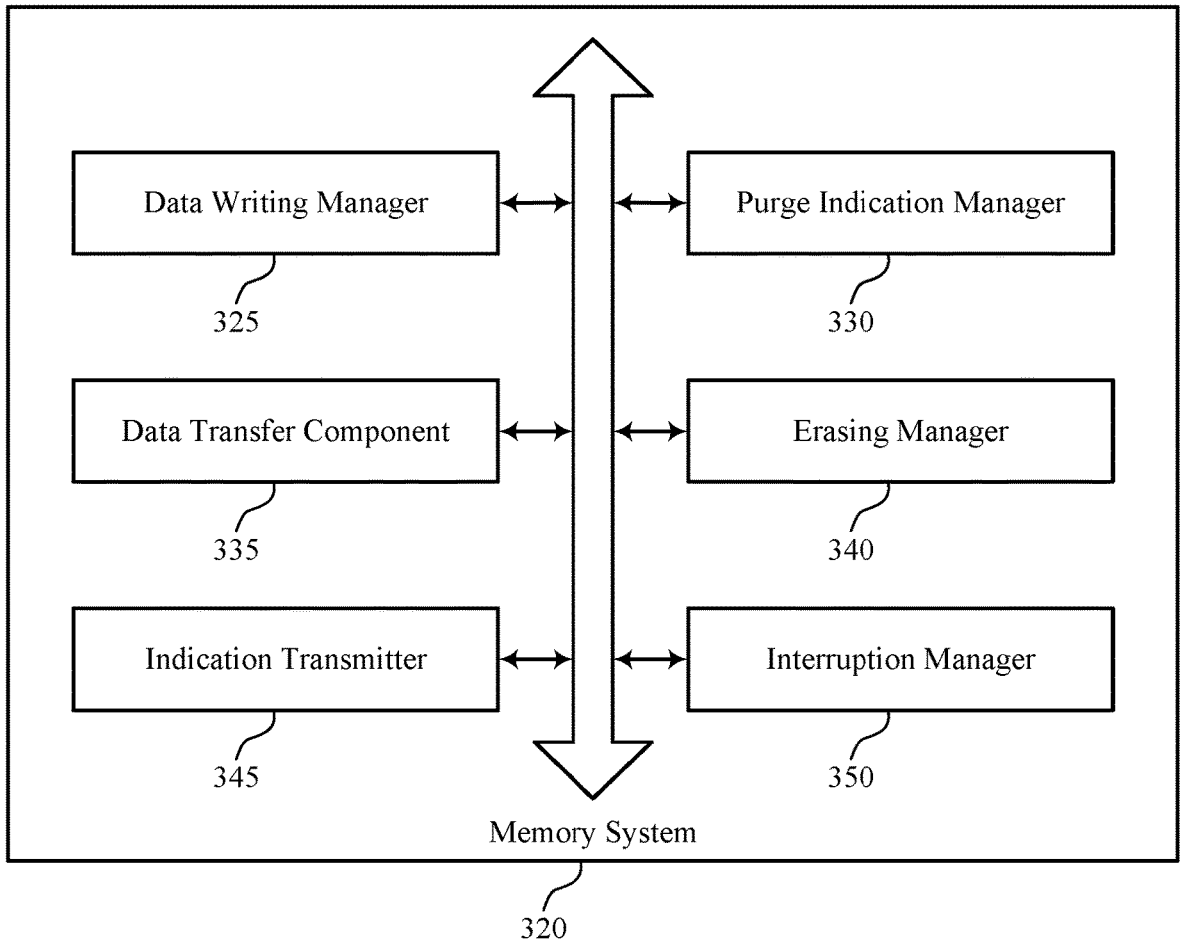
FIG. 3 shows a block diagram of a memory system that supports purging data from a memory device in accordance with examples as disclosed herein.

FIG. 3 shows a block diagram 300 of a memory system 320 that supports purging data from a memory device in accordance with examples as disclosed herein. The memory system 320 may be an example of aspects of a memory system as described with reference to FIGS. 1 and 2. The memory system 320, or various components thereof, may be an example of means for performing various aspects of purging data from a memory device as described herein. For example, the memory system 320 may include a data writing manager 325, a purge indication manager 330, a data transfer component 335, an erasing manager 340, an indication transmitter 345, an interruption manager 350, or any combination thereof. Each of these components may communicate, directly or indirectly, with one another (e.g., via one or more buses).

The data writing manager 325 may be configured as or otherwise support a means for receiving, from a host system, a first command to write first data to an address storing an encryption key in a first portion of the memory system that is configured to store secure information, the encryption key configured to encrypt data stored in a second portion of the memory system that is configured to store information associated with the host system. The purge indication manager 330 may be configured as or otherwise support a means for receiving, from the host system after receiving the first command, an indication of a second command to purge the first portion of the memory system. The data transfer component 335 may be configured as or otherwise support a means for transferring, basing at least in part on receiving the second command, second data including the first data and one or more additional encryption keys from the first portion of the memory system to a third portion of the memory system configured to store secure information. The erasing manager 340 may be configured as or otherwise support a means for erasing the second data from the first portion of the memory system based at least in part on the transferring. The indication transmitter 345 may be configured as or otherwise support a means for transmitting, to the host system, an indication that the second command is complete based at least in part on the erasing.

In some examples, the data writing manager 325 may be configured as or otherwise support a means for writing the first data to the address of the first portion of the memory system to overwrite the encryption key based at least in part on receiving the first command, where transferring the second data to the third portion of the memory system is based at least in part on writing the first data.

In some examples, to support receiving the indication of the second command, the purge indication manager 330 may be configured as or otherwise support a means for identifying that a register of the memory system stores a value that indicates the second command.

In some examples, to support receiving the indication of the second command, the purge indication manager 330 may be configured as or otherwise support a means for receiving, from the host system, the second command to purge the encryption key from the first portion of the memory system.

In some examples, the data transfer component 335 may be configured as or otherwise support a means for determining that the one or more additional encryption keys are valid based at least in part on third data stored at the memory system indicating whether encryption keys stored at the first portion of the memory system are valid, where transferring the second data including the one or more additional encryption keys is based at least in part on the determining.

In some examples, the data writing manager 325 may be configured as or otherwise support a means for receiving, from the host system, a third command to store the encryption key in the first portion of the memory system, where receiving the first command is based at least in part on receiving the first command.

In some examples, the interruption manager 350 may be configured as or otherwise support a means for receiving, from the host system, an indication to interrupt purging the first portion of the memory system after receiving the indication of the second command. In some examples, the interruption manager 350 may be configured as or otherwise support a means for performing one or more access operations at the first portion of the memory system based at least in part on receiving the indication to interrupt purging. In some examples, the interruption manager 350 may be configured as or otherwise support a means for receiving, from the host system, an indication to resume purging the first portion of the memory system after performing the one or more access operations, where transmitting the indication that the second command is complete is based at least in part on receiving the indication to resume purging.

In some examples, receiving the indication to interrupt purging includes identifying that a register of the memory system stores a first value that indicates interrupting purging. In some examples, receiving the indication to resume purging includes identifying that the register of the memory system stores a second value, different from the first value, that indicates resuming purging.

In some examples, the first portion of the memory system and the third portion of the memory system include an RPMB.

In some examples, the erasing manager 340 may be configured as or otherwise support a means for initiating a garbage collection operation for the first portion of the memory system based at least in part on transferring the second data, where erasing the second data is performed as part of the garbage collection operation.

Figure 4:
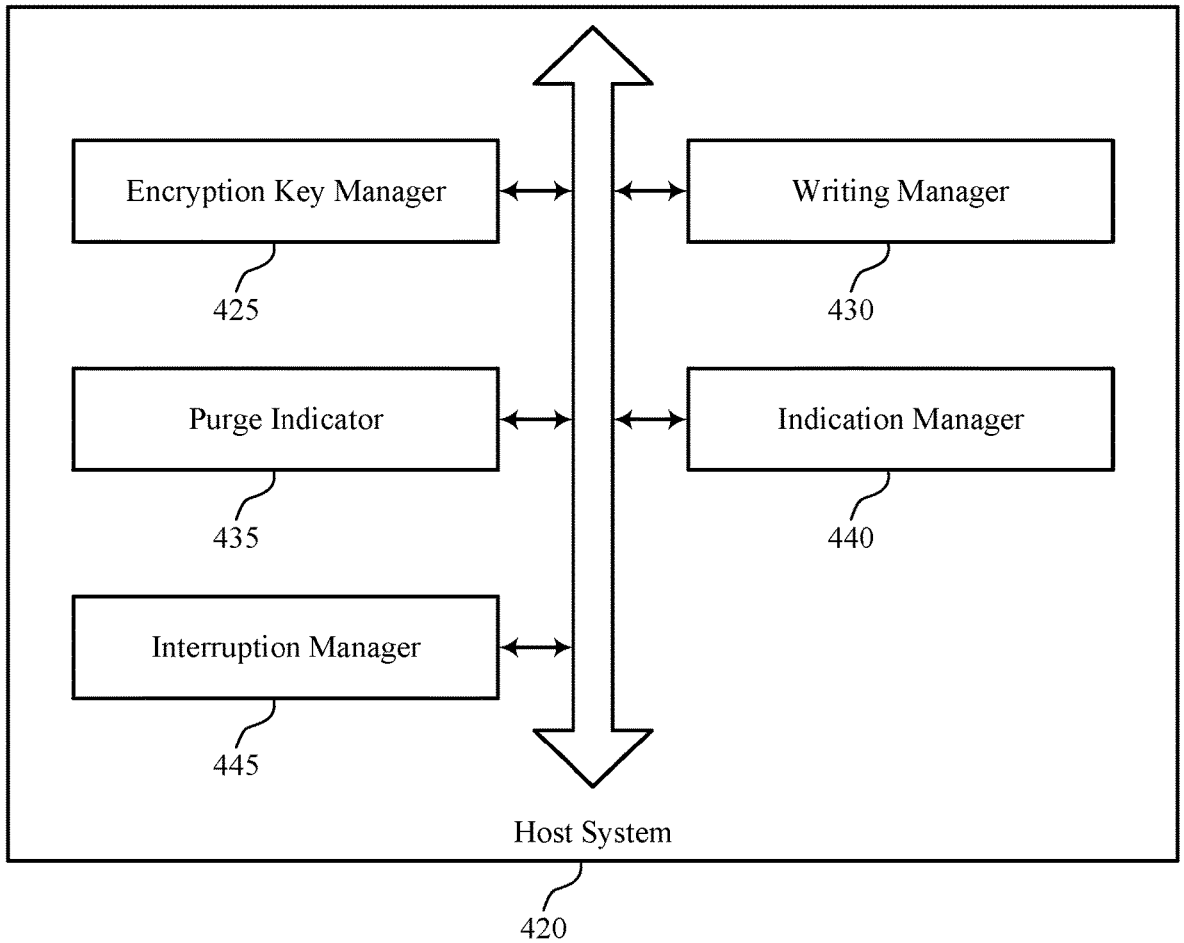
FIG. 4 shows a block diagram of a host system that supports purging data from a memory device in accordance with examples as disclosed herein.

FIG. 4 shows a block diagram 400 of a host system 420 that supports purging data from a memory device in accordance with examples as disclosed herein. The host system 420 may be an example of aspects of a host system as described with reference to FIGS. 1 and 2. The host system 420, or various components thereof, may be an example of means for performing various aspects of purging data from a memory device as described herein. For example, the host system 420 may include an encryption key manager 425, a writing manager 430, a purge indicator 435, an indication manager 440, an interruption manager 445, or any combination thereof. Each of these components may communicate, directly or indirectly, with one another (e.g., via one or more buses).

The encryption key manager 425 may be configured as or otherwise support a means for transmitting, to a memory system, a first command to store an encryption key at an address in a first portion of the memory system that is configured to store secure information, the encryption key configured to encrypt data stored in a second portion of the memory system that is configured to store information associated with the host system. The writing manager 430 may be configured as or otherwise support a means for transmitting, to the memory system, a second command to write first data to the address storing the encryption key. The purge indicator 435 may be configured as or otherwise support a means for indicating, to the memory system, a third command to purge the first portion of the memory system based at least in part on transmitting the second command. The indication manager 440 may be configured as or otherwise support a means for receiving, from the memory system, an indication that the third command to purge the first portion of the memory system is complete.

In some examples, to support indicating the third command, the purge indicator 435 may be configured as or otherwise support a means for setting a register of the memory system to a value that indicates, to the memory system, the third command.

In some examples, to support indicating the third command, the purge indicator 435 may be configured as or otherwise support a means for transmitting the third command to the memory system.

In some examples, the interruption manager 445 may be configured as or otherwise support a means for indicating, to the memory system, to interrupt purging the first portion of the memory system after indicating the third command. In some examples, the interruption manager 445 may be configured as or otherwise support a means for accessing the first portion of the memory system based at least in part on indicating to interrupt purging. In some examples, the interruption manager 445 may be configured as or otherwise support a means for indicating, to the memory system, to resume purging the first portion of the memory system based at least in part on accessing the first portion of the memory system, where receiving the indication that the third command is complete is based at least in part on indicating to resume purging.

In some examples, indicating to interrupt purging includes setting a register of the memory system to a first value that indicates interrupting purging. In some examples, indicating to resume purging includes setting the register of the memory system to a second value, different from the first value, that indicates resuming purging. In some examples, the first portion of the memory system includes an RPMB.

Figure 5:
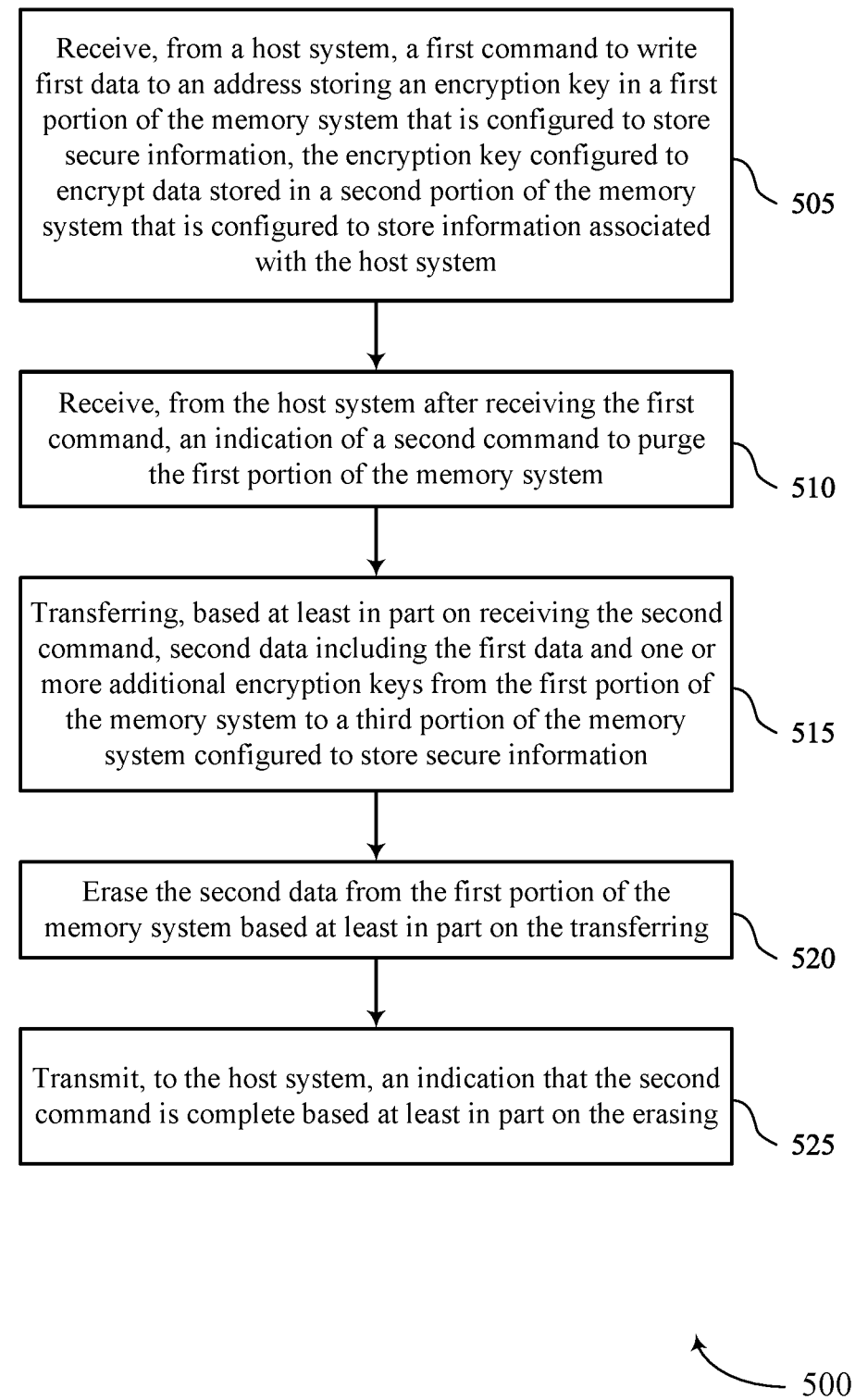
FIGS. 5 and 6 show flowcharts illustrating a method or methods that support purging data from a memory device in accordance with examples as disclosed herein.

FIG. 5 shows a flowchart illustrating a method or methods 500 that supports purging data from a memory device in accordance with aspects of the present disclosure. The operations of method 500 may be implemented by a memory system or its components as described herein. For example, the operations of method 500 may be performed by a memory system as described with reference to FIG. 3. In some examples, a memory system may execute a set of instructions to control the functional elements of the memory system to perform the described functions. Additionally or alternatively, a memory system may perform aspects of the described functions using special-purpose hardware.

At 505, the memory system may receive, from a host system, a first command to write first data to an address storing an encryption key in a first portion of the memory system that is configured to store secure information, the encryption key configured to encrypt data stored in a second portion of the memory system that is configured to store information associated with the host system. The operations of 505 may be performed according to the methods described herein. In some examples, aspects of the operations of 505 may be performed by a data writing manager as described with reference to FIG. 3.

At 510, the memory system may receive, from the host system after receiving the first command, an indication of a second command to purge the first portion of the memory system. The operations of 510 may be performed according to the methods described herein. In some examples, aspects of the operations of 510 may be performed by a purge indication manager as described with reference to FIG. 3.

At 515, the memory system may transfer, basing at least in part on receiving the second command, second data including the first data and one or more additional encryption keys from the first portion of the memory system to a third portion of the memory system configured to store secure information. The operations of 515 may be performed according to the methods described herein. In some examples, aspects of the operations of 515 may be performed by a data transfer component as described with reference to FIG. 3.

At 520, the memory system may erase the second data from the first portion of the memory system based on the transferring. The operations of 520 may be performed according to the methods described herein. In some examples, aspects of the operations of 520 may be performed by an erasing manager as described with reference to FIG. 3.

At 525, the memory system may transmit, to the host system, an indication that the second command is complete based on the erasing. The operations of 525 may be performed according to the methods described herein. In some examples, aspects of the operations of 525 may be performed by an indication transmitter as described with reference to FIG. 3.

In some examples, an apparatus as described herein may perform a method or methods, such as the method 500. The apparatus may include features, means, or instructions (e.g., a non-transitory computer-readable medium storing instructions executable by a processor) for receiving, from a host system, a first command to write first data to an address storing an encryption key in a first portion of the memory system that is configured to store secure information, the encryption key configured to encrypt data stored in a second portion of the memory system that is configured to store information associated with the host system, receiving, from the host system after receiving the first command, a second command to purge the first portion of the memory system, transferring, basing at least in part on receiving the second command, second data including the first data and one or more additional encryption keys from the first portion of the memory system to a third portion of the memory system configured to store secure information, erasing the second data from the first portion of the memory system based on the transferring, and transmitting, to the host system, an indication that the second command is complete based on the erasing.

Some examples of the method 500 and the apparatus described herein may further include operations, features, means, or instructions for writing the first data to the address of the first portion of the memory system to overwrite the encryption key based on receiving the first command, where transferring the second data to the third portion of the memory system may be based on writing the first data.

In some examples of the method 500 and the apparatus described herein, receiving the indication of the second command may include operations, features, means, or instructions for identifying that a register of the memory system stores a value that indicates the second command.

In some examples of the method 500 and the apparatus described herein, receiving the indication of the second command may include operations, features, means, or instructions for receiving, from the host system, the second command to purge the encryption key from the first portion of the memory system.

Some examples of the method 500 and the apparatus described herein may further include operations, features, means, or instructions for determining that the one or more additional encryption keys may be valid based on third data stored at the memory system indicating whether encryption keys stored at the first portion of the memory system may be valid, where transferring the second data including the one or more additional encryption keys may be based on the determining.

Some examples of the method 500 and the apparatus described herein may further include operations, features, means, or instructions for receiving, from the host system, a third command to store the encryption key in the first portion of the memory system, where receiving the first command may be based on receiving the first command.

Some examples of the method 500 and the apparatus described herein may further include operations, features, means, or instructions for receiving, from the host system, an indication to interrupt purging the first portion of the memory system after receiving the indication of the second command, performing one or more access operations at the first portion of the memory system based on receiving the indication to interrupt purging, and receiving, from the host system, an indication to resume purging the first portion of the memory system after performing the one or more access operations, where transmitting the indication that the second command may be complete may be based on receiving the indication to resume purging.

In some examples of the method 500 and the apparatus described herein, receiving the indication to interrupt purging may include operations, features, means, or instructions for identifying that a register of the memory system stores a first value that indicates interrupting purging, and receiving the indication to resume purging may include operations, features, means, or instructions for identifying that the register of the memory system stores a second value, different from the first value, that indicates resuming purging.

In some examples of the method 500 and the apparatus described herein, the first portion of the memory system and the third portion of the memory system include an RPMB.

Some examples of the method 500 and the apparatus described herein may further include operations, features, means, or instructions for initiating a garbage collection operation for the first portion of the memory system based on transferring the second data, where erasing the second data may be performed as part of the garbage collection operation.

Figure 6:
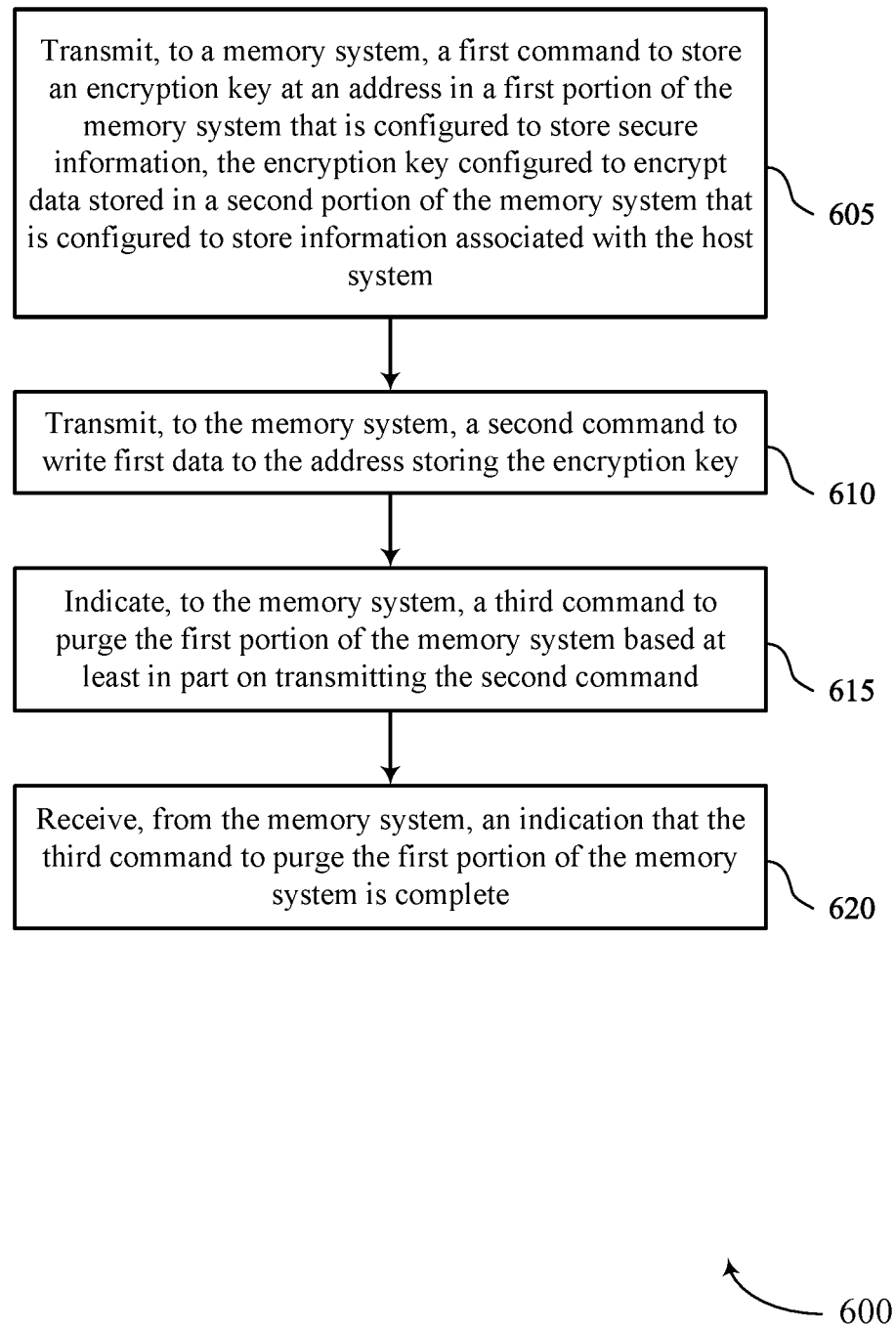

FIG. 6 shows a flowchart illustrating a method or methods 600 that supports purging data from a memory device in accordance with aspects of the present disclosure. The operations of method 600 may be implemented by a host device or its components as described herein. For example, the operations of method 600 may be performed by a host device as described with reference to FIG. 4. In some examples, a host device may execute a set of instructions to control the functional elements of the host device to perform the described functions. Additionally or alternatively, a host device may perform aspects of the described functions using special-purpose hardware.

At 605, the host device may transmit, to a memory system, a first command to store an encryption key at an address in a first portion of the memory system that is configured to store secure information, the encryption key configured to encrypt data stored in a second portion of the memory system that is configured to store information associated with the host system. The operations of 605 may be performed according to the methods described herein. In some examples, aspects of the operations of 605 may be performed by an encryption key manager as described with reference to FIG. 4.

At 610, the host device may transmit, to the memory system, a second command to write first data to the address storing the encryption key. The operations of 610 may be performed according to the methods described herein. In some examples, aspects of the operations of 610 may be performed by a writing manager as described with reference to FIG. 4.

At 615, the host device may indicate, to the memory system, a third command to purge the first portion of the memory system based on transmitting the second command. The operations of 615 may be performed according to the methods described herein. In some examples, aspects of the operations of 615 may be performed by a purge indicator as described with reference to FIG. 4.

At 620, the host device may receive, from the memory system, an indication that the third command to purge the first portion of the memory system is complete. The operations of 620 may be performed according to the methods described herein. In some examples, aspects of the operations of 620 may be performed by an indication manager as described with reference to FIG. 4.

In some examples, an apparatus as described herein may perform a method or methods, such as the method 600. The apparatus may include features, means, or instructions (e.g., a non-transitory computer-readable medium storing instructions executable by a processor) for transmitting, to a memory system, a first command to store an encryption key at an address in a first portion of the memory system that is configured to store secure information, the encryption key configured to encrypt data stored in a second portion of the memory system that is configured to store information associated with the host system, transmitting, to the memory system, a second command to write first data to the address storing the encryption key, indicating, to the memory system, a third command to purge the first portion of the memory system based on transmitting the second command, and receiving, from the memory system, an indication that the third command to purge the first portion of the memory system is complete.

In some examples of the method 600 and the apparatus described herein, indicating the third command may include operations, features, means, or instructions for setting a register of the memory system to a value that indicates, to the memory system, the third command.

In some examples of the method 600 and the apparatus described herein, indicating the third command may include operations, features, means, or instructions for transmitting the third command to the memory system.

Some examples of the method 600 and the apparatus described herein may further include operations, features, means, or instructions for indicating, to the memory system, to interrupt purging the first portion of the memory system after indicating the third command, accessing the first portion of the memory system based on indicating to interrupt purging, and indicating, to the memory system, to resume purging the first portion of the memory system based on accessing the first portion of the memory system, where receiving the indication that the third command may be complete may be based on indicating to resume purging.

In some examples of the method 600 and the apparatus described herein, indicating to interrupt purging may include operations, features, means, or instructions for setting a register of the memory system to a first value that indicates interrupting purging, and indicating to resume purging may include operations, features, means, or instructions for setting the register of the memory system to a second value, different from the first value, that indicates resuming purging.

In some examples of the method 600 and the apparatus described herein, the first portion of the memory system includes an RPMB.

It should be noted that the methods described herein are possible implementations, and that the operations and the steps may be rearranged or otherwise modified and that other implementations are possible. Furthermore, portions from two or more of the methods may be combined.

It should be noted that the methods described above describe possible implementations, and that the operations and the steps may be rearranged or otherwise modified and that other implementations are possible. Further, portions from two or more of the methods may be combined.

Another apparatus is described. The apparatus may include a memory device and a controller coupled with the memory device and configured to cause the memory system to receive, from a host system, a first command to write first data to an address storing an encryption key in a first portion of the memory system that is configured to store secure information, the encryption key configured to encrypt data stored in a second portion of the memory system that is configured to store information associated with the host system; receive, from the host system after receiving the first command, an indication of a second command to purge the first portion of the memory system; transfer, based at least in part on receiving the second command, second data including the first data and one or more additional encryption keys from the first portion of the memory system to a third portion of the memory system configured to store secure information; erase the second data from the first portion of the memory system based at least in part on the transferring; and transmit, to the host system, an indication that the second command is complete based at least in part on the erasing.

In some examples of the apparatus, the controller may be further configured to write the first data to the address of the first portion of the memory system to overwrite the encryption key based at least in part on receiving the first command, and transferring the second data to the third portion of the memory system may be based at least in part on writing the first data.

In some examples of the apparatus, the apparatus may include a register coupled with the controller and configured to store a value that indicates the second command, where receiving the indication of the second command may be based at least in part on the register storing the value that indicates the second command.

In some examples of the apparatus, the controller may be further configured to receive, from the host system, the second command, and receiving the indication of the second command may be based at least in part on receiving the second command from the host system.

In some examples of the apparatus, the controller may be further configured to determine that the one or more additional encryption keys may be valid based at least in part on third data stored at the memory system indicating whether encryption keys stored at the first portion of the memory system may be valid, and transferring the second data including the one or more additional encryption keys may be based at least in part on the determining.

Another apparatus is described. The apparatus may include a controller configured to couple with a memory system, where the controller is configured to cause the apparatus to transmit, to the memory system, a first command to store an encryption key at an address in a first portion of the memory system that is configured to store secure information, the encryption key configured to encrypt data stored in a second portion of the memory system that is configured to store information associated with the apparatus; transmit, to the memory system, a second command to write first data to the address storing the encryption key; indicate, to the memory system, a third command to purge the first portion of the memory system based at least in part on transmitting the second command; and receive, from the memory system, an indication that the third command to purge the first portion of the memory system is complete In some examples of the apparatus, the controller may be further configured to cause the apparatus to set a register of the memory system to a value that indicates the third command to the memory system.

In some examples of the apparatus, the controller may be further configured to cause the apparatus to transmit the third command to the memory system.

In some examples of the apparatus, the controller may be further configured to cause the apparatus to indicate, to the memory system, to interrupt purging the first portion of the memory system after indicating the third command, access the first portion of the memory system based at least in part on indicating to interrupt purging, and indicate, to the memory system, to resume purging the first portion of the memory system based at least in part on accessing the first portion of the memory system, where receiving the indication that the third command may be complete may be based at least in part on indicating to resume purging.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A non-transitory computer-readable medium storing code at a memory system, the code comprising instructions executable by a processor to:
receive, from a host system, a first command to write first data to an address storing an encryption key in a first portion of the memory system that is configured to store secure information, the encryption key configured to encrypt data stored in a second portion of the memory system that is configured to store information associated with the host system;
receive, from the host system after receiving the first command, an indication of a second command to purge the first portion of the memory system;
transfer, based at least in part on receiving the second command, second data including the first data and one or more additional encryption keys from the first portion of the memory system to a third portion of the memory system configured to store secure information;
erase the second data from the first portion of the memory system based at least in part on the transferring; and
transmit, to the host system, an indication that the second command is complete based at least in part on the erasing.

2. The non-transitory computer-readable medium of claim 1, wherein the instructions are further executable by the processor to:
write the first data to the address of the first portion of the memory system to overwrite the encryption key based at least in part on receiving the first command, wherein transferring the second data to the third portion of the memory system is based at least in part on writing the first data.

3. The non-transitory computer-readable medium of claim 1, wherein the instructions to receive the indication of the second command are executable by the processor to:
identify that a register of the memory system stores a value that indicates the second command.

4. The non-transitory computer-readable medium of claim 1, wherein the instructions to receive the indication of the second command are executable by the processor to:
receive, from the host system, the second command to purge the encryption key from the first portion of the memory system.

5. The non-transitory computer-readable medium of claim 1, wherein the instructions are further executable by the processor to:
determine that the one or more additional encryption keys are valid based at least in part on third data stored at the memory system indicating whether encryption keys stored at the first portion of the memory system are valid, wherein transferring the second data including the one or more additional encryption keys is based at least in part on the determining.

6. The non-transitory computer-readable medium of claim 1, wherein the instructions are further executable by the processor to:
receive, from the host system, a third command to store the encryption key in the first portion of the memory system, wherein receiving the first command is based at least in part on receiving the third command.

7. The non-transitory computer-readable medium of claim 1, wherein the instructions are further executable by the processor to:
receive, from the host system, an indication to interrupt purging the first portion of the memory system after receiving the indication of the second command;
perform one or more access operations at the first portion of the memory system based at least in part on receiving the indication to interrupt purging; and
receive, from the host system, an indication to resume purging the first portion of the memory system after performing the one or more access operations, wherein transmitting the indication that the second command is complete is based at least in part on receiving the indication to resume purging.

8. The non-transitory computer-readable medium of claim 7, wherein:
receiving the indication to interrupt purging comprises identifying that a register of the memory system stores a first value that indicates interrupting purging; and
receiving the indication to resume purging comprises identifying that the register of the memory system stores a second value, different from the first value, that indicates resuming purging.

9. The non-transitory computer-readable medium of claim 1, wherein the first portion of the memory system and the third portion of the memory system comprise a Replay Protected Memory Block (RPMB).

10. The non-transitory computer-readable medium of claim 1, wherein the instructions are further executable by the processor to:
initiate a garbage collection operation for the first portion of the memory system based at least in part on transferring the second data, wherein erasing the second data is performed as part of the garbage collection operation.

11. A non-transitory computer-readable medium storing code at a host system, the code comprising instructions executable by a processor to:
transmit, to a memory system, a first command to store an encryption key at an address in a first portion of the memory system that is configured to store secure information, the encryption key configured to encrypt data stored in a second portion of the memory system that is configured to store information associated with the host system;
transmit, to the memory system, a second command to write first data to the address storing the encryption key;
indicate, to the memory system, a third command to purge the first portion of the memory system based at least in part on transmitting the second command; and
receive, from the memory system, an indication that the third command to purge the first portion of the memory system is complete.

12. The non-transitory computer-readable medium of claim 11, wherein the instructions to indicate the third command are executable by the processor to:
set a register of the memory system to a value that indicates, to the memory system, the third command.

13. The non-transitory computer-readable medium of claim 11, wherein the instructions to indicate the third command are executable by the processor to:
transmit the third command to the memory system.

14. The non-transitory computer-readable medium of claim 11, wherein the instructions are further executable by the processor to:
indicate, to the memory system, to interrupt purging the first portion of the memory system after indicating the third command;
access the first portion of the memory system based at least in part on indicating to interrupt purging; and
indicate, to the memory system, to resume purging the first portion of the memory system based at least in part on accessing the first portion of the memory system, wherein receiving the indication that the third command is complete is based at least in part on indicating to resume purging.

15. The non-transitory computer-readable medium of claim 14, wherein:
indicating to interrupt purging comprises setting a register of the memory system to a first value that indicates interrupting purging; and
indicating to resume purging comprises setting the register of the memory system to a second value, different from the first value, that indicates resuming purging.

16. The non-transitory computer-readable medium of claim 11, wherein the first portion of the memory system comprises a Replay Protected Memory Block (RPMB).

17. A memory system, comprising:
a memory device;
a controller coupled with the memory device and configured to cause the memory system to:
receive, from a host system, a first command to write first data to an address storing an encryption key in a first portion of the memory system that is configured to store secure information, the encryption key configured to encrypt data stored in a second portion of the memory system that is configured to store information associated with the host system;
receive, from the host system after receiving the first command, an indication of a second command to purge the first portion of the memory system;
transfer, based at least in part on receiving the second command, second data including the first data and one or more additional encryption keys from the first portion of the memory system to a third portion of the memory system configured to store secure information;
erase the second data from the first portion of the memory system based at least in part on the transferring; and
transmit, to the host system, an indication that the second command is complete based at least in part on the erasing.

18. The memory system of claim 17, wherein:
the controller is further configured to write the first data to the address of the first portion of the memory system to overwrite the encryption key based at least in part on receiving the first command; and
transferring the second data to the third portion of the memory system is based at least in part on writing the first data.

19. The memory system of claim 17, further comprising:
a register coupled with the controller and configured to store a value that indicates the second command, wherein receiving the indication of the second command is based at least in part on the register storing the value that indicates the second command.

20. The memory system of claim 17, wherein:
the controller is further configured to receive, from the host system, the second command; and
receiving the indication of the second command is based at least in part on receiving the second command from the host system.

21. The memory system of claim 17, wherein:
the controller is further configured to determine that the one or more additional encryption keys are valid based at least in part on third data stored at the memory system indicating whether encryption keys stored at the first portion of the memory system are valid; and
transferring the second data including the one or more additional encryption keys is based at least in part on the determining.

22. An apparatus, comprising:
a controller configured to couple with a memory system, wherein the controller is configured to cause the apparatus to:
transmit, to the memory system, a first command to store an encryption key at an address in a first portion of the memory system that is configured to store secure information, the encryption key configured to encrypt data stored in a second portion of the memory system that is configured to store information associated with the apparatus;
transmit, to the memory system, a second command to write first data to the address storing the encryption key;
indicate, to the memory system, a third command to purge the first portion of the memory system based at least in part on transmitting the second command; and
receive, from the memory system, an indication that the third command to purge the first portion of the memory system is complete.

23. The apparatus of claim 22, wherein the controller is further configured to cause the apparatus to set a register of the memory system to a value that indicates the third command to the memory system.

24. The apparatus of claim 22, wherein the controller is further configured to cause the apparatus to transmit the third command to the memory system.

25. The apparatus of claim 22, wherein the controller is further configured to cause the apparatus to:
- indicate, to the memory system, to interrupt purging the first portion of the memory system after indicating the third command;
- access the first portion of the memory system based at least in part on indicating to interrupt purging; and
- indicate, to the memory system, to resume purging the first portion of the memory system based at least in part on accessing the first portion of the memory system, wherein receiving the indication that the third command is complete is based at least in part on indicating to resume purging.

* * * * *